United States Patent
Shentu et al.

(10) Patent No.: US 12,053,887 B2
(45) Date of Patent: Aug. 6, 2024

(54) IMAGING PROCESS FOR DETECTING FAILURES MODES

(71) Applicant: Embodied Intelligence Inc., Emeryville, CA (US)

(72) Inventors: Yide Shentu, Berkeley, CA (US); David Mascharka, Emeryville, CA (US); Tianhao Zhang, Emeryville, CA (US); Yan Duan, Emeryville, CA (US); Jasmine Deng, Emeryville, CA (US); Xi Chen, Emeryville, CA (US)

(73) Assignee: Embodied Intelligence Inc., Emeryville, CA (US)

( * ) Notice: Subject to any disclaimer, the term of this patent is extended or adjusted under 35 U.S.C. 154(b) by 220 days.

(21) Appl. No.: 17/193,875

(22) Filed: Mar. 5, 2021

(65) Prior Publication Data
US 2021/0276185 A1    Sep. 9, 2021

Related U.S. Application Data

(60) Provisional application No. 62/985,982, filed on Mar. 6, 2020.

(51) Int. Cl.
*B25J 9/16* (2006.01)

(52) U.S. Cl.
CPC .......... *B25J 9/1653* (2013.01); *B25J 9/1669* (2013.01); *B25J 9/1687* (2013.01); *B25J 9/1697* (2013.01)

(58) Field of Classification Search
CPC ...... B25J 9/1653; B25J 9/1669; B25J 9/1687; B25J 9/1697; G06N 3/02
See application file for complete search history.

(56) References Cited

U.S. PATENT DOCUMENTS

| | | | | |
|---|---|---|---|---|
| 10,706,587 | B1 * | 7/2020 | Sorgi | G06T 7/80 |
| 10,766,136 | B1 * | 9/2020 | Porter | G06N 3/045 |
| 2015/0224650 | A1 * | 8/2015 | Xu | B25J 9/1692 |
| | | | | 414/730 |

(Continued)

FOREIGN PATENT DOCUMENTS

WO    2019060529    3/2019

OTHER PUBLICATIONS

IEEE NPL published by SCIS-ISIS 2012, Nov. 20-24, 2012; title: "Modeling and implementation of net based distributed control for industrial robotics system" by ("Yasuda") (Year: 2012).*

(Continued)

*Primary Examiner* — Sohana Tanju Khayer

(57) ABSTRACT

Various embodiments of the present technology generally relate to robotic devices, artificial intelligence, and computer vision. More specifically, some embodiments relate to an imaging process for detecting failure modes in a robotic motion environment. In one embodiment, a method of detecting failure modes in a robotic motion environment comprises collecting one or more images of a multiple scenes throughout a robotic motion cycle. Images may be collected by one or more cameras positioned at one or more locations for collecting images with various views. Images collected throughout the robotic motion cycle may be processed in real-time to determine if any failure modes are present in their respective scenes, report when failure modes are present, and may be used to direct a robotic device accordingly.

20 Claims, 9 Drawing Sheets

(56) References Cited

U.S. PATENT DOCUMENTS

| | | | |
|---|---|---|---|
| 2018/0215545 A1* | 8/2018 | High | G05D 1/0261 |
| 2018/0276501 A1* | 9/2018 | Yamada | G06V 10/454 |
| 2018/0281200 A1* | 10/2018 | Rosenstein | B25J 9/1656 |
| 2019/0071261 A1* | 3/2019 | Wertenberger | B25J 9/1697 |
| 2019/0099891 A1* | 4/2019 | Tomioka | B25J 9/1697 |
| 2019/0188435 A1* | 6/2019 | Davis | G06V 10/10 |
| 2019/0261566 A1* | 8/2019 | Robertson | B25J 11/00 |
| 2020/0017027 A1* | 1/2020 | Leitner | G09G 5/377 |
| 2020/0061811 A1* | 2/2020 | Iqbal | G06N 3/08 |
| 2020/0101613 A1* | 4/2020 | Yamada | G06T 7/73 |
| 2020/0130176 A1* | 4/2020 | Hudson | B25J 9/161 |
| 2020/0156261 A1* | 5/2020 | Lin | B25J 15/0023 |
| 2020/0306988 A1* | 10/2020 | Shaffer | G05B 19/4184 |
| 2021/0023715 A1* | 1/2021 | Zhang | B25J 9/1692 |
| 2021/0053217 A1* | 2/2021 | Davidson | B25J 9/1697 |
| 2021/0078167 A1* | 3/2021 | Khansari Zadeh | G06T 7/90 |
| 2021/0081791 A1* | 3/2021 | Goodrich | G06N 3/08 |
| 2021/0110504 A1* | 4/2021 | Lukka | B25J 9/026 |
| 2021/0122053 A1* | 4/2021 | Hallock | B25J 9/1697 |
| 2021/0229284 A1* | 7/2021 | Irie | G05B 19/0428 |

OTHER PUBLICATIONS

International Search Report and Written Opinion for PCT Application No. PCT/US2021/021184, filed Mar. 5, 2021; 16 pages.

International Search Report and Written Opinion for PCT Application No. PCT/US2021/021184, filed Mar. 5, 2021, mailed Jun. 16, 2021; 16 pages.

Yasuda; Modeling and Implentation of Net Based Distributed Control for Industrial Robotic Systems; SCIS-ISIS 2012, Kobe, Japan, Nov. 2012; 6 pages.

Kaipa, et al.; Addressing Perception Uncertainty Induced Failure Modes in Robotic Bin-Picking; http://www.elseiver.com/open-access/userlicense/1.0/; May 4, 2016; 40 pages.

* cited by examiner

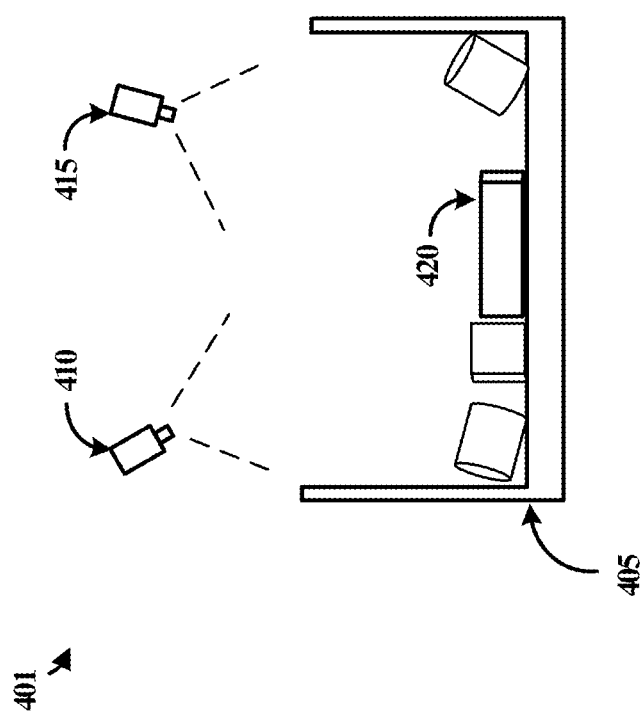

IMAGING PROCESS FOR DETECTING FAILURES MODES

CROSS-REFERENCE TO RELATED APPLICATIONS

This application is related to and claims priority to U.S. Provisional Patent Application No. 62/985,982, entitled "IMAGING PROCESS FOR DETECTING FAILURE MODES," filed on Mar. 6, 2020, which is incorporated by reference herein in its entirety.

BACKGROUND

Many tasks require the ability of a machine to sense or perceive its environment and then apply that knowledge about its environment to future decisions. Machines programmed solely to repeat a task or action, encounter issues or frequently get stuck, often requiring human intervention too frequently to increase productivity or efficiency. Robotic devices and other machines are often guided with some degree of computer vision.

Computer vision techniques enable a system to gain insight into its environment based on digital images, videos, scans, and similar visual mechanisms. High-level vision systems are necessary for a machine to accurately acquire, process, and analyze data from the real world. Computer vision and machine learning methods allow a machine to receive input and generate output based on the input. Some machine learning techniques utilize deep artificial neural networks having one or more hidden layers for performing a series of calculations leading to the output. In many present-day applications, convolutional neural networks are used for processing images as input and generating a form of output or making decisions based on the output.

Artificial neural networks, modeled loosely after the human brain, learn mapping functions from inputs to outputs and are designed to recognize patterns. A deep neural network comprises an input layer and an output layer, with one or more hidden layers in between. The layers are made up of nodes, in which computations take place. Various training methods are used to train an artificial neural network during which the neural network uses optimization to continually update weights at the various nodes based on failures until a satisfactory model is achieved. Many types of deep neural networks currently exist and are used for a broad variety of applications and industries including computer vision, series forecasting, automated driving, performing medical procedures, aerospace, and many more. One advantage of deep artificial neural networks is their ability to learn by example, rather than needing to be specifically programmed to perform a task, especially when the tasks would require an impossible amount of programming to perform the operations they are used for today.

It is with respect to this general technical environment that aspects of the present technology disclosed herein have been contemplated. Furthermore, although a general environment has been discussed, it should be understood that the examples described herein should not be limited to the general environment identified in the background.

BRIEF SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various embodiments of the present technology generally relate to robotic devices, artificial intelligence, and computer vision. More specifically, some embodiments relate to a process for detecting failure modes in a robotic motion environment, wherein the process includes multiple observations at different steps in the process to detect failure modes. In an embodiment of the present technology, a method of detecting failure modes in a robotic motion environment comprises collecting one or more first images of a first scene while a robot is in a first position and determining if a failure mode of a first set of failure modes is present in the first scene based on the one or more first images. The method further comprises, when the failure mode of the first set of failure modes is not present in the first scene, collecting one or more intermediary images of an intermediary scene while the robot is in an intermediary position and determining if a failure mode of a second set of failure modes is present in the intermediary scene based on the one or more intermediary images. The method further comprises, when the failure mode of the second set of failure modes is not present in the intermediary scene collecting one or more final images of a final scene while the robot is in a final position and determining if a failure mode of a third set of failure modes is present in the final based on the one or more final images.

In some embodiments, the intermediary scene comprises at least a portion of the robot. The method may further comprise producing a segmentation prediction based on the one or more first images, wherein the segmentation prediction identifies one or more distinct objects in the first scene and determining if the failure mode of the first set of failure modes is present in the first scene based on the segmentation prediction. The first set of failure modes may comprise at least one of: a failure more in which no objects are present, a failure mode in which no objects are suitable for interaction with the robot, and a failure mode in which the robot is in a position that will cause an error. Further, in some embodiments, the robot is a robotic arm for picking and placing objects. In certain embodiments of the method, the first scene comprises one or more objects for the robot to pick up, the one or more first images of the first scene are collected before the robot attempts to pick up an object of the one or more objects from the first scene, the one or more intermediary images of the intermediary scene are collected after the robot attempts to pick up the object of the one or more objects from the first scene, the intermediary scene comprises at least a portion of the robot and at least one object of the one or more objects from the first scene picked up by the robot, the one or more final images of the final scene are collected after the robot attempts to place the one or more objects from the first scene picked up by the robot, and the final scene comprises an area in which the robot attempts to place the one or more objects from the first scene picked up by the robot.

The second set of failure modes may comprise at least one of: a failure mode in which the robot picked up two objects, a failure mode in which an object picked up by the robot is damaged, a failure mode in which an object is deformed after being picked up by the robot, and a failure mode in which the robot is in a position that will cause an error. In some embodiments, the method further comprises, when the failure mode of the first set of failure modes is present in the first scene, reporting that the failure mode of the first set of failure modes is present, when the failure mode of the second set of failure modes is present in the intermediary scene, reporting that the failure mode of the second set of failure modes is present, and, when the failure mode of the final set of failure modes is presented in the final scene, reporting that the failure mode of the final set of failure modes is present. The method may further comprise, when the failure mode of the first set of failure modes is present in the first scene, resolving an error associated with the failure mode of the first set of failure modes, when the failure mode of the second set of failure modes is present in the intermediary scene, resolving an error associated with the failure mode of the intermediary set of failure modes, and when the failure mode of the final set of failure modes is presented in the final scene, resolving an error associated with the failure mode of the final set of failure modes.

In an alternative embodiment, a failure mode detection system comprises one or more computer-readable storage media, a processing system operatively coupled to the one or more computer-readable storage media, and program instructions, stored on the one or more computer-readable storage media. The program instructions, when read and executed by the processing system, direct the processing system to collect one or more first images of a first scene while a robot is in a first position and determine if a failure mode of a first set of failure modes is present in the first scene based on the one or more first images. When the failure mode of the first set of failure modes is not present in the first scene, the program instructions, when read and executed by the processing system, direct the processing system to collect one or more intermediary images of an intermediary scene while the robot is in an intermediary position and determine if a failure mode of a second set of failure modes is present in the intermediary scene based on the one or more intermediary images. When the failure mode of the second set of failure modes is not present in the intermediary scene, the program instructions, when read and executed by the processing system, further direct the processing system to collect one or more final images of a final scene while the robot is in a final position and determine if a failure mode of a third set of failure modes is present in the final based on the one or more final images.

In yet another embodiment, a failure mode detection system comprises at least one robot configured to perform a task, a computer-vision system configured to capture one or more images at multiple stages of the task, and program instructions, stored on one or more computer-readable storage media. The program instructions, when read and executed by a processing system, direct the processing system to collect one or more first images of a first scene while a robot is in a first position and determine if a failure mode of a first set of failure modes is present in the first scene based on the one or more first images. When the failure mode of the first set of failure modes is not present in the first scene, the program instructions, when read and executed by the processing system, further direct the processing system to collect one or more intermediary images of an intermediary scene while the robot is in an intermediary position and determine if a failure mode of a second set of failure modes is present in the intermediary scene based on the one or more intermediary images. When the failure mode of the second set of failure modes is not present in the intermediary scene, the program instructions, when read and executed by the processing system, further direct the processing system to collect one or more final images of a final scene while the robot is in a final position and determine if a failure mode of a third set of failure modes is present in the final based on the one or more final images.

BRIEF DESCRIPTION OF THE DRAWINGS

Many aspects of the disclosure can be better understood with reference to the following drawings. The components in the drawings are not necessarily drawn to scale. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

FIGS. 4A-4C illustrates a series of steps for collecting images in a robotic motion environment in accordance with some embodiments of the present technology;

Figure 1:
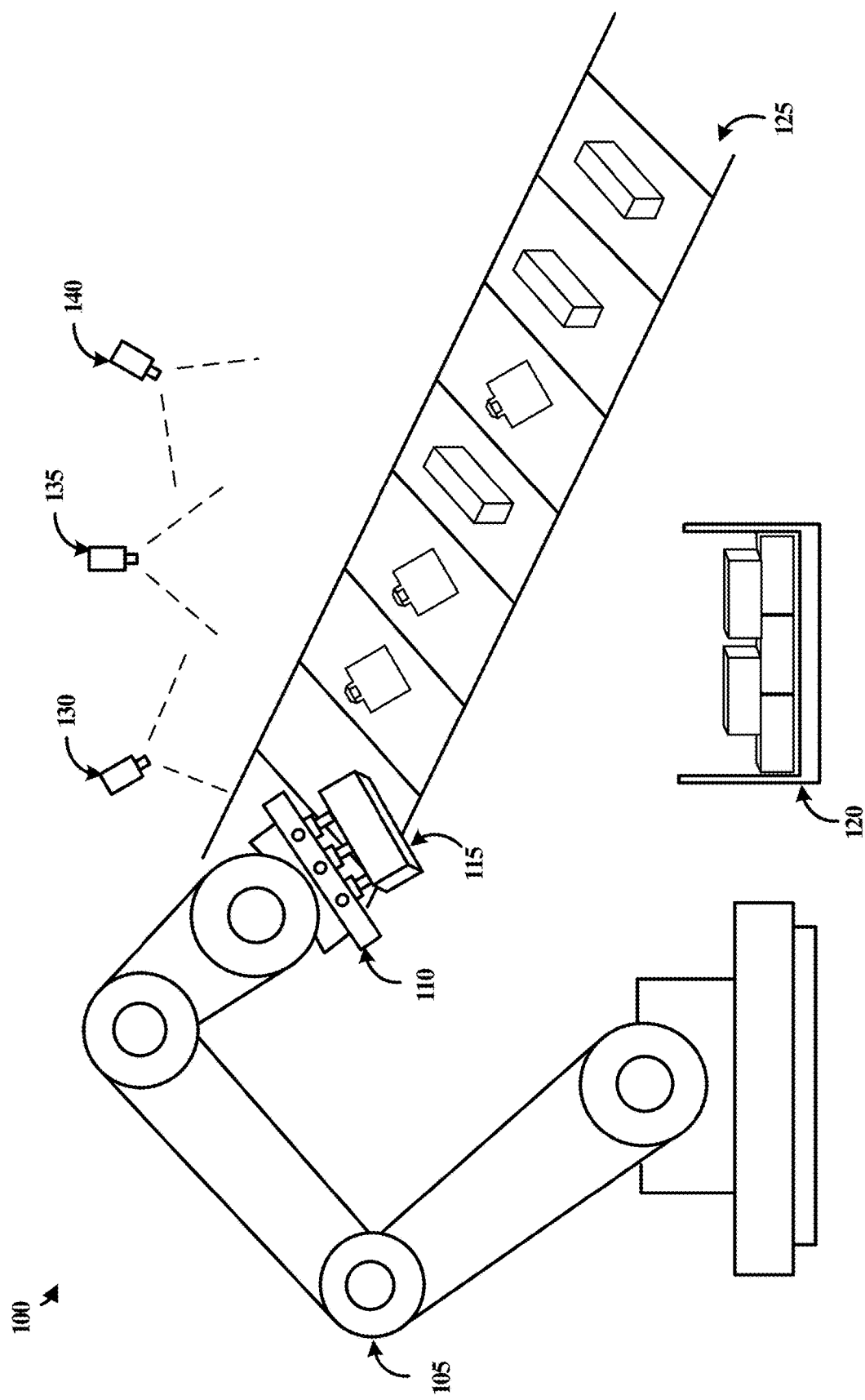
FIG. 1 illustrates a robotic motion environment in accordance with some embodiments of the present technology.

The drawings have not necessarily been drawn to scale. Similarly, some components or operations may not be separated into different blocks or combined into a single block for the purposes of discussion of some of the embodiments of the present technology. Moreover, while the technology is amendable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Various embodiments of the technology described herein generally relate to systems and methods for detecting failure modes in robotic motion environments. More specifically, certain embodiments relate to an imaging process for detecting distinct failure modes at various points in a robotic motion cycle to discover and recover from errors. In some examples, the technology discussed herein may be applied to a robotic picking environment in which a robotic arm is responsible for picking and placing objects at certain locations. Some errors regularly occur in a pick and place cycle, such as accidental double picks. These errors may not be visually detectable from one vantage point but are visually detectable from others.

For example, some errors may only be observable during a portion of the pick and place cycle, such as while the robotic arm is in motion (i.e., between picking and placing), but not observable at other points in the pick and place cycle, such as before picking or after placing. In a scenario with deformable objects, it may be common that the object deforms while being picked by the robotic arm or while being moved to a new location. By capturing observations throughout the pick and place cycle, including at various points along the robotic arm's trajectory, errors can be discovered and rectified instead of going unnoticed leading to problems later in the cycle or beyond.

Thus, the present technology utilizes series of images collected by one or more cameras to capture visual information at multiple points along a robot's trajectory. In an embodiment, multiple cameras are be placed in strategic locations such that they observe different parts of the trajectory in order to capture common but difficult-to-diagnose errors. Multiple scenes are be imaged at various points along the trajectory, wherein each scene is captured with a single camera (i.e., FIG. 2), or multiple cameras may be utilized to collect images of each scene. In another embodiment, multiple cameras are utilized to capture images of the full scene, but from different angles, wherein the multiple cameras still collect images at various points throughout the motion cycle (i.e., FIG. 1). Any number of repeated observations may be present in a failure detection process in accordance with the present technology.

Some systems in which the present technology may be used include systems that perform processes having a staged series of actions, while other systems that the present technology may be used in accordance with include system having a continuous or non-discrete series of actions. Regardless of which of these scenarios the present technology is used with, as a robot moves through a process, the imaging system may capture images at different moment or instances through the process to check for errors during the process. Robotic motion processes that do not implement a version of the present technology, may experience unrecoverable errors because they were not detected early enough or were not detected at all. However, in robotic motion processes that do implement a version of the present technology, those unrecoverable errors become recoverable errors, because the present technology provides a means to detect errors in real time. Errors can be detected quickly and used to make decisions on future actions, such as pause robotic motion, report an error, and/or prevent an error for propagating or going unnoticed. By detecting errors at multiple points in a robotic motion cycle, failure rates decrease because the error detections may prevent total or catastrophic failure. For example, the present technology may be used to determine that a robot is in a position that will cause failure if it moves or attempts to complete a task. Thus, motion may be halted until the problem is fixed, rather than going ahead and performing the action and encountering the failure.

Failure modes can be present in a variety of different forms depending on a given scenario in which the present technology may be implemented. In the example of the robotic picking and placing environment previously discussed, failure modes may include double-picks (i.e., when the robot accidentally picks more than one object at a time), an object changing shape or deforming as a result of being picked, an object being damaged as a result of being picked, an object being dropped, loss of suction seal holding the object to the robotic arm, and other failures that may be encountered in a pick and place scenario. Failure modes may pertain to robotic failures, such as causing harm, damage, or errors to the robotic device itself, or failures may pertain to the process or environment with which the robot interacts, such as incorrect order fulfillment, double-picks, or damage to products or other parts of the environment, as just a few examples.

In order for a computer vision system to operate as described herein, it requires the ability to understand some of the information within collected images. For example, it would not be possible for a computer vision system to determine that a robotic device is in a position that will cause an error if it is not able to identify the robotic device in an image and does not have knowledge regarding positions that are likely to cause errors. Thus, some computer vision systems in accordance with the present technology utilize segmentation methods to identify distinct objects.

Artificial neural networks, such as those that may be implemented within embodiments related to failure mode detection, computer vision, robotic motion control, image segmentation, and similar models described herein, are used to learn mapping functions from inputs to outputs. Generating mapping functions is done through neural network training processes. Many various types of training and machine learning methods presently exist and are commonly used including supervised learning, unsupervised learning, reinforcement learning, imitation learning, and more. During training, the weights in a neural network are continually updated in response to errors, failures, or mistakes. In order to create a robust, working model, training data is used to initially dial in the weights until a sufficiently strong model is found or the learning process gets stuck and is forced to stop. In some implementations, the weights may continue to update throughout use, even after the training period is over, while in other implementations, they may not be allowed to update after the training period.

Parameters of a neural network are found using optimization with many, or sometimes infinite, possible solutions. Modern deep learning models, especially for computer vision and image processing, are based on convolutional neural networks, although they may also incorporate other deep generative models. As described herein, artificial neural networks for failure mode detection, computer vision, image processing, robotic picking, and other processes described herein first require training. A variety of different training methods may be used to train a neural network for processing images and/or detecting failure modes in accordance with embodiments of the technology described herein.

FIG. 1 illustrates an example of a robotic motion environment in accordance with some embodiments of the present technology. Warehouse environment 100 includes robotic arm 105, bin 120, conveyor belt 125, camera 130, camera 135, and camera 140. Robotic arm comprises picking element 110 which includes a set of suction-based picking mechanisms. Bin 120 holds boxes, however any other types of items may be in a bin or similar container for picking in accordance with the present example. In the present example, robotic arm 105 is a six-degree-of-freedom (6DOF) robotic arm. Picking element 110 is designed for picking items out of bin 120 and placing them onto compartments of conveyor belt 125. In some examples, robotic arm 105 is an autonomous robot that includes a means for recognizing the environment around it and processing that information to develop ways to perform tasks. Thus, if robotic arm 105 picks items out of bin 120, it should be able to sense the location and position of a specific item and apply that to determine how to pick up the item and move it to a desired location. A robot capable of sensing and applying that knowledge, even within highly repetitive settings, dramatically decreases the need for human intervention, manipulation, and assistance. Thus, human presence may no longer be required when items aren't perfectly stacked or when a robot gets stuck, as a few examples. If a robot regularly gets stuck, it may defeat the purpose of having a robot altogether, because humans may be required to frequently assist the robot.

In some examples, robotic arm 105 and picking element 110 may pick boxes from bin 120 one at a time according to orders received and place the items on conveyor belt 125 for packaging. In another example robotic arm 105 and picking element 110 place picked item into packages for shipment. Furthermore, robotic arm 105 and picking element 110 may be responsible for picking items from various locations in addition to bin 120. For example, several bins comprising different merchandise may be located in proximity to robotic arm 105, and robotic arm 105 may fulfill requests for the different pieces of merchandise by picking the correct type of merchandise and placing it onto conveyor belt 125. Picking element 110 may comprise one or more picking mechanisms for grabbing items in a bin. Picking mechanisms may include one or more suction mechanisms, gripping mechanisms, robotic hands, pinching mechanisms, magnets, or any other picking mechanisms that could be used in accordance with the present example. In certain embodiments, determining which item to pick up and how to pick it up is determined using at least one deep artificial neural network. The deep neural network (DNN) may be trained to guide robotic motion, such as item pick-up, and determine which items have the greatest probabilities of pick-up success. In other embodiments, robotic motion may be guided by a program that does not use a DNN for decision making.

A computer vision system in accordance with embodiments herein may comprise any number of visual instruments, such as cameras or scanners, in order to guide robotic motion, image processing, or failure mode detection. A computer vision system may receive visual information and provide it to a computing system for analysis. Based on the visual information provided by the computer vision system, the system can guide motions and/or actions taken by robotic arm 105 in the present example. A computer vision system may provide information that can be used to decipher geometries, material properties, distinct items (i.e., segmentation), bin boundaries, and other visual information related to picking items from a bin. Based on this information, the system may decide which item to attempt to pick up and can then use the computer vision system to guide robotic arm 105 to the item. A computer vision system may include imaging devices in a variety of locations allowing it to properly view bin 120 and may be physically or communicatively coupled to robotic arm 105. In some examples, a computer vision system may be mounted to a component of robotic arm 105 from which it can view bin 120 or may be separate from the robotic device.

In accordance with the present disclosure, a computer vision system comprises camera 130, camera 135, and camera 140 for detecting failure modes. Each of camera 130, camera 135, and camera 140 may comprise one or more individual cameras, including arrays of cameras. In the present example, each of camera 130, camera 135, and camera 140 may collect images of the robotic motion scene at various times throughout the robotic motion cycle. However, in other examples, cameras may be responsible for viewing smaller portions of the robotic motion cycle or smaller areas, as will be discussed further with respect FIG. 2. Although three cameras are shown in the present example, any number of cameras may be used to collect images throughout the robotic motion cycle in accordance with the present example. Deep learning is used to process images collected by camera 130, camera 135, and camera 140 in the present example.

In the present example, robotic arm 105 goes through a series of steps during a pick and place cycle, during which each of camera 130, camera 135, and camera 140 collect a series of images at certain times through the pick and place cycle. FIG. 1 illustrates a point in the pack in place cycle in which robotic arm 105 has successfully picked up box 115 from bin 120 and is in the process of moving box 115 to conveyor belt 125 where it will place box 115. Moving box 115 between bin 120 and conveyor belt 125 is an intermediary step of the pick and place cycle in the present example.

The pick and place cycle of the present examples includes taking a series of images along the pick and place cycle. At the beginning of the pick and place cycle, camera 130, camera 135, and camera 140 each collect one or more images of the scene within their range of view and process the images to determine which items in bin 120 are able to be picked, which item to pick, and where or how to pick the item. During this step, the cameras may detect certain errors that indicate one or more failure modes. Errors that may be detected in this step include detecting that the bin is empty, detecting that nothing in the bin is able to be picked for a variety of reasons (e.g., too heavy, wrong material, bad position, etc.), detecting that an item is too small or too large for picking element 110 to pick up, determining that robotic arm 105 is in a position that will cause an error, or detecting similar errors that may cause failure.

Once it is determined that no errors are present in the scene, robotic arm 105 begins picking an object from bin 120 and then raises the object directly above the bin. Camera 130, camera 135, and camera 140 may then collect one or more images of the scene again to determine if any errors are present while the robotic arm is holding the object directly above the bin upon processing the images. Holding the object directly above the bin after picking reduces the risk of damaging or losing the object if it drops. Thus, the scene can be imaged in a low risk setting before attempting to move the object. Errors that may be detected in this step include detecting that robotic arm 105 pick up more than one object, detecting that an object was damaged during the pick (e.g., picking element 110 ripped off the label of an item instead of picking up the entire item), detecting that the object changed shape such that it will no longer fit in the destination or is no longer suitable for order fulfillment, or detecting that robotic arm 105 is in a position that will cause an error.

Once it is again determined that no errors are present in the scene, robotic arm 105 begins moving the object (box 115) to conveyor belt 125. Camera 130, camera 135, and camera 140 are then used to collect at least one set of intermediary images while box 115 is being moved to the conveyor belt but before it reaches the conveyor belt to determine if an error is present upon processing the image. Errors that may be detected during this step include detecting if more than one object is being held by robotic arm 105, detecting if the object was damaged during movement, detecting if that object changed shape during movement such that it will no longer fit in the destination location, or detecting that robotic arm 105 is in a position that will cause an error.

Once it is again determined that no errors are present in the scene, robotic arm 105 may attempt to place the object onto conveyor belt 125. Camera 130, camera 135, and camera 140 may then collect one or more images of the final scene in the pick and place cycle to detect if any errors are present upon processing the images. Errors that may be detected in the final scene include detecting if more than one item was placed on the conveyor belt, detecting if an item was damaged during movement or placement, or detecting that an item changed shape during movement or placement such that it will no longer fit in the destination location. If the computer vision system comprising camera 130, camera 135, and camera 140 detects an error at any of the aforementioned steps, it may send a report or error message and/or pause robotic motion until the error is resolved, in some embodiments. The number and timing of steps performed in the present example is not intended to limit the number of steps, number of images captured, or the like and the technology discussed in the present example may be utilized to capture images for any number of steps related to robotic motion.

The computer vision system including camera 130, camera 135, and camera 140 may help guide robotic arm 105 during the pick and place cycle. In some examples, before picking box 115, the computer vision system imaged the contents of bin 120, performed image processing, such as image segmentation, using the images, and identified box 115 for picking based on the results. Segmentation plays an important role in a robotic motion environment such as in the example of FIG. 1. However, image processing may be performed in a variety of manners in accordance with the present technology and used as input for failure mode detection models discussed herein.

Different scenarios can be extremely difficult to process, especially when everything in a scene looks almost identical, has the same pattern, has overlapping objects, or similar scenarios. When a computer vision system images a scene, it collects pixels with intensity and color, but fails to gather information related to an understanding of the situation such as observing distinct objects next to each other. A computer vision system guided by a neural network can make a best guess at how to segment multiple items in an image but may not be able to determine if it is correct. There are many ways for a computer vision system to differentiate pixels from each other in an attempt to segment and image and there are lots of ways to fail at correctly segmenting images. Some scenarios may have high consequences for being wrong and acting anyway, so the ability to detect potential failures throughout a robotic motion cycle can be extremely useful.

Figure 2:
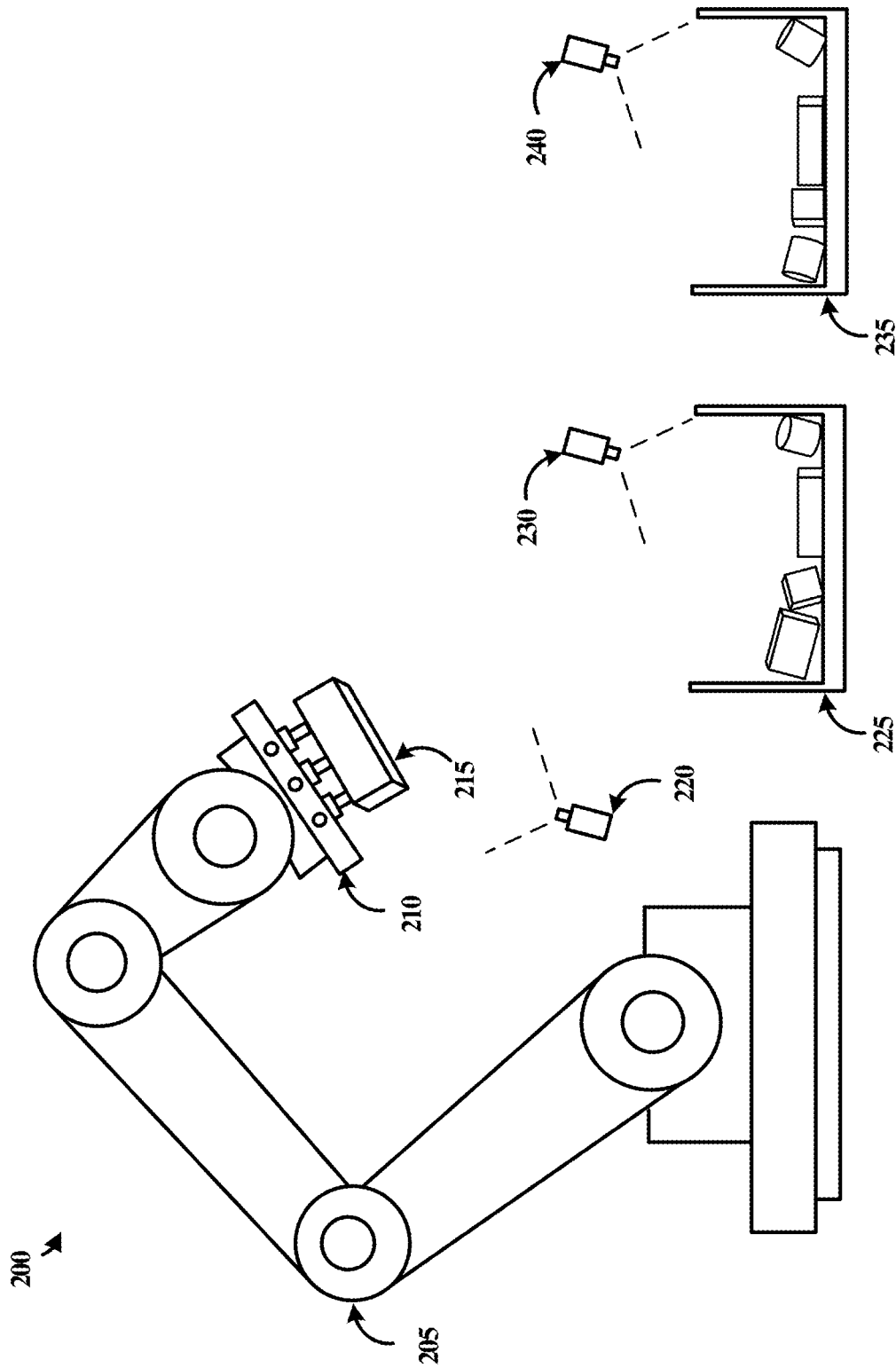
FIG. 2 illustrates a robotic motion environment in accordance with some embodiments of the present technology.

FIG. 2 illustrates robotic motion environment 200 in accordance with some embodiments of the present technology. Robotic motion environment 200 includes robotic arm 205, picking device 210, box 215, camera 220, bin 225, camera 230, bin 235, and camera 240. In the present example, robotic arm 205 is attempting move box 215 from bin 225 to bin 235. Each of cameras 220, 230, and 240 may represent a single camera or may represent an array of cameras used to capture one or more images of their associated bins.

FIG. 2, contrary to FIG. 1, comprises three cameras each responsible for collecting images at different locations corresponding to different portions of the pick and place cycle. For example, camera 230 may collect one or more images of the contents of bin 225 before robotic arm 205 attempts to pick up any items in order to detect failure modes. Camera 230 may also be responsible for collecting images after robotic arm has attempted to pick up an item from bin 225, in some examples. Camera 220 of the present example may responsible for at least collecting one or more images during motion of robotic arm 205 that can be used to detect failure modes. Camera 220 may be responsible collecting images at additional times during the pick and place cycle. Similarly, camera 240 may be used to collect one or more images of bin 235 during the pick and place cycle, including collecting one or more images after robotic arm 205 has attempted to place box 215 in bin 235. The number of cameras used and number of steps may vary according to a given scenario.

It may be beneficial, in robotic motion scenarios, to include cameras at several different positions and angles for detecting failure modes. In some examples, multiple cameras at different positions and/or angles may be used to image a single scene corresponding to a portion of a robotic motion process. Multiple images of a scene may help decipher accurate information during image processing. For example, some scenarios, such as overlapping objects, may be difficult to detect with an image taken from directly above the objects. However, having multiple images from different viewpoints, such as some from the side of the objects, allows the computer vision system to see scenarios from different perspectives in order to more accurately decipher shapes and location of objects in a scene. Thus, some images in accordance with the present technology may be taken from above a scene, below a scene, next to a scene, and combinations or variations thereof.

Figure 3:
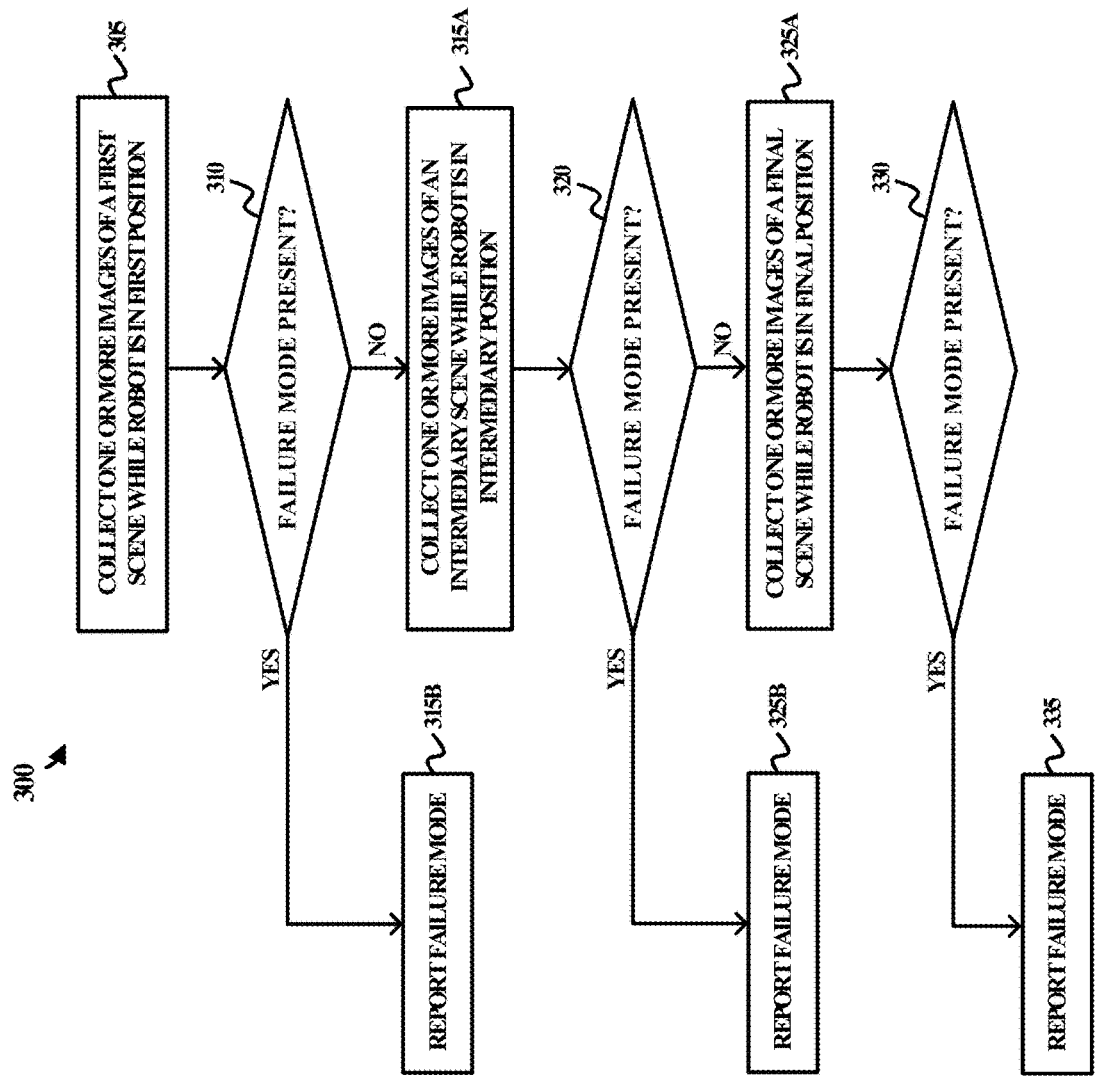
FIG. 3 is a flow chart illustrating a series of steps in accordance with some embodiments of the present technology.

FIG. 3 illustrates process 300 for detecting failure modes in a robotic motion environment in accordance with the present technology. In step 305, at least one camera is used to collect one or more images of a first scene while a robot is in a first position. The first scene may include or may not include the robot. The one or more images are then processed using deep learning techniques, in some embodiments, and used to determine if a failure mode is present in step 310. If a failure mode is present, the system may report that the failure mode is present in step 315B. A report may be generated and communicated to a person or system responsible for addressing errors, in some examples. Furthermore, the system may direct the robot to cease motion upon detecting that a failure mode is present so that the error can be addressed. Alternatively, instead of or in addition to reporting that a failure mode was detected, process 300 may further include resolving an error associated with the error mode.

If a failure mode is not present, at least one camera is used to collect one or more images of an intermediary scene while the robot is in an intermediary position in step 315A. The intermediary position may be while the robot is stationary, in some examples, while in other examples the robot may be in motion in the intermediary position. The images are then processed and used to determine if a failure mode is present in step 320. If it is determined that a failure mode is present, the system may report that the failure mode is present in step 325B. A report may be generated and communicated to a person or system responsible for addressing errors, in some examples. Furthermore, the system may direct the robot to cease motion upon detecting that a failure mode is present so that the error can be addressed. Alternatively, instead of or in addition to reporting that a failure mode was detected, process 300 may further include resolving an error associated with the error mode.

If it is determined that a failure mode is not present in step 320, one or more cameras are used to collect one or more images of a final scene while the robot is in a final position in step 325A. The final position may be at the end of a robotic motion cycle, in some examples. The final scene may include or may not include a portion of the robot. The images are then processed and used to determine if a failure mode is present in step 330. If it is determined that a failure mode is present, the system may report that a failure mode is present in step 335B. A report may be generated and communicated to a person or system responsible for addressing errors, in some examples. Furthermore, the system may direct the robot to cease motion upon detecting that a failure mode is present so that the error can be addressed, or the robot may return to the beginning of the robotic motion cycle. If a failure mode is not present, the robot may continue operation as usual or return to the beginning of the cycle. Alternatively, instead of or in addition to reporting that a failure mode was detected, process 300 may further include resolving an error associated with the error mode.

The number of steps and timing of steps presented in FIG. 3 is not intended to limit the number of observations that may be used to detect failure modes in accordance with the present technology. In other examples, one, two, four, five, and so on observation points may be utilized for detecting failure modes in accordance with the present technology.

Figure 4B:
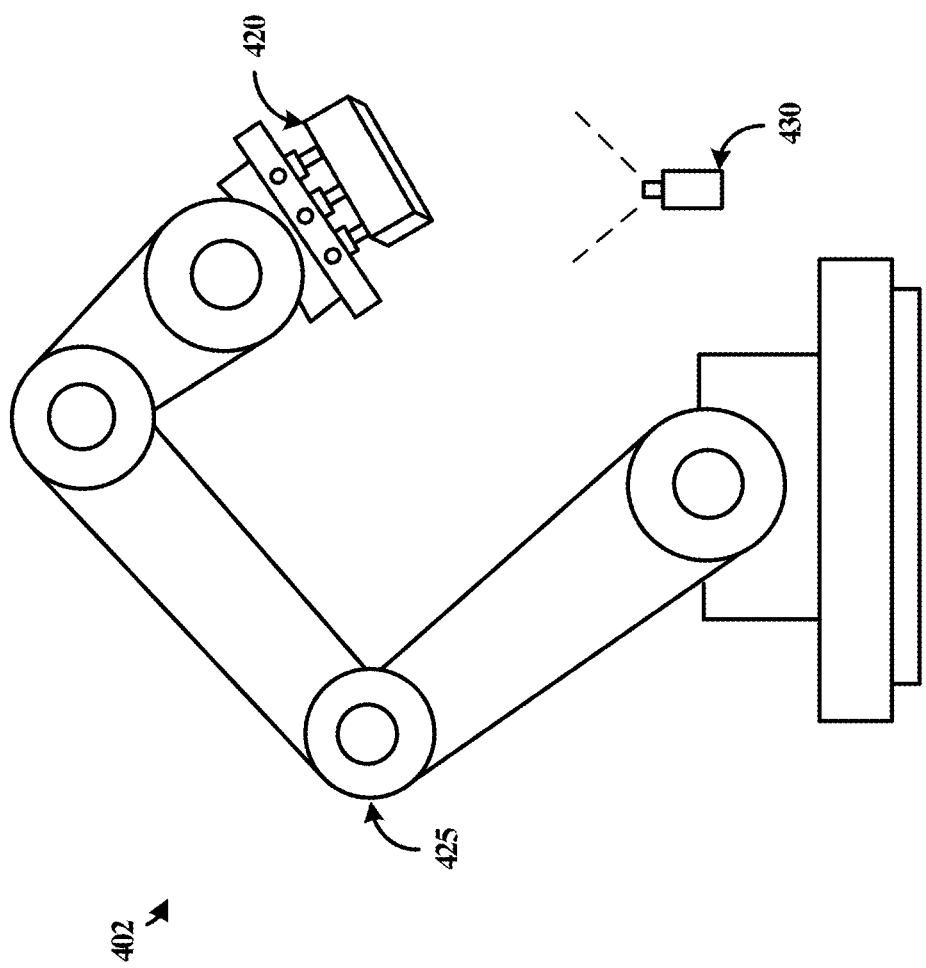
Figure 4C:
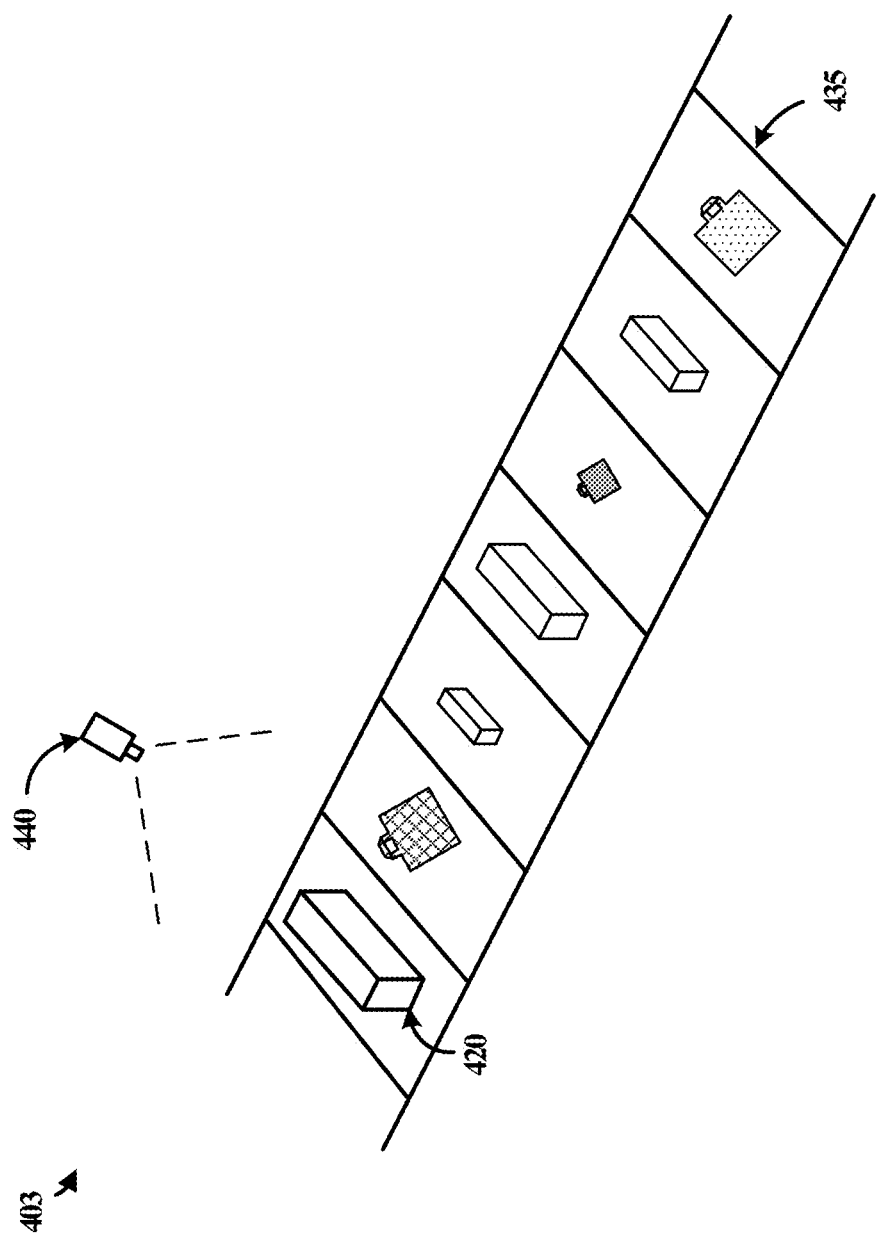

FIGS. 4A-4C illustrate a series of steps for imaging a robotic motion cycle for detecting distinct failure modes in accordance with some embodiments of the present technology. Environment 401 includes bin 405, camera 410, and camera 415. Bin 405 includes box 420. Environment 401 represents a first scene, wherein images may be collected by camera 410 and camera 415 of the first scene prior to a robotic device attempting to pick an object from bin 405 (i.e., at the beginning of a robotic picking process). The objects of bin 405 may be multiple of the same objects, or different objects. Furthermore, bin 405 may take the form of any other region that may contain objects for picking in accordance with the present example.

In the present example, the first step is to collect at least one image with each of camera 410 and camera 415 from overhead the first scene (i.e., bin 405). Camera 410 and camera 415 are both overhead bin 405 but are positioned at different angles such that objects can be more easily deciphered during image processing based on the multiple views. The step shown in FIG. 4A is used to detect which objects in bin 405 can be picked, which object to direct the robotic arm to pick, and where or how to pick the object. The step shown in FIG. 4A is also used to detect any errors that may represent failure modes. Examples of errors that may be detected in this step include detecting that the bin is empty, detecting that nothing is suitable to be picked, and detecting that the items are too small or too large to be picked using the present configuration.

FIG. 4B shows environment 402 comprising robotic arm 425, box 420, and camera 430. Environment 402 represents an intermediary scene, wherein images may be collected by camera 430 during an intermediary portion or step of the robotic picking process. The intermediary scene is used to detect failure modes in environment 402. In the present example, camera 430 is used to capture at least one image of the scene from below box 420. In other examples, multiple images may be captured from multiple viewpoints with multiple cameras to detect failure modes in the scene.

Examples of failure modes that may be detected in the intermediary scene shown in FIG. 4B include detecting if robotic arm 425 picked up more than one object, detecting if an object was damaged during pick up or during motion, detecting if an object was successfully picked up, detecting if an object changed shape such that it will not longer fit in the destination location or no longer meets requirements, and detecting if robotic arm 425 is in a position that will cause an error. In other examples, more than one intermediary step may exist in which additional images may be collected by the same camera or additional cameras from various positions during another intermediary point in the robotic motion process. In an example, upon processing the images collected by camera 430 and determining that a failure mode is present, such as detecting a double pick, a report may be sent out indicating that a failure mode was detected. Furthermore, robotic arm 425 may be directed to pause motion until the error is addressed or may be directed to place the one or more objects back in bin 405.

FIG. 4C shows environment 403 comprising conveyor belt 435, camera 440, and box 420. Environment 403 represents a final scene, wherein images may be collected by camera 440 at the end of the robotic picking process (i.e., after box 420 has been placed on conveyor belt 435. The final scene is used to detect failure modes in environment 403. In the present example, camera 440 is used to capture at least one image of the scene from above conveyor belt 435. In other examples, multiple images may be captured from multiple viewpoints with multiple cameras to detect failure modes in the scene. Examples of failure modes that may be detected in the final scene shown in FIG. 4C include detecting if robotic arm 425 placed more than one object on conveyor belt 435, detecting if an object was damaged prior to or during placement of the object on conveyor belt 435, and detecting if an object changed shape prior to or during placement of the object such that the object is no longer suitable for the destination location or does not meet requirements.

The number of steps and timing of steps presented in FIGS. 4A-4C is not intended to limit the number of observations that may be used to detect failure modes in accordance with the present technology. In other examples, one, two, four, five, and so on observation points may be utilized for detecting failure modes in accordance with the present technology.

Figure 5:
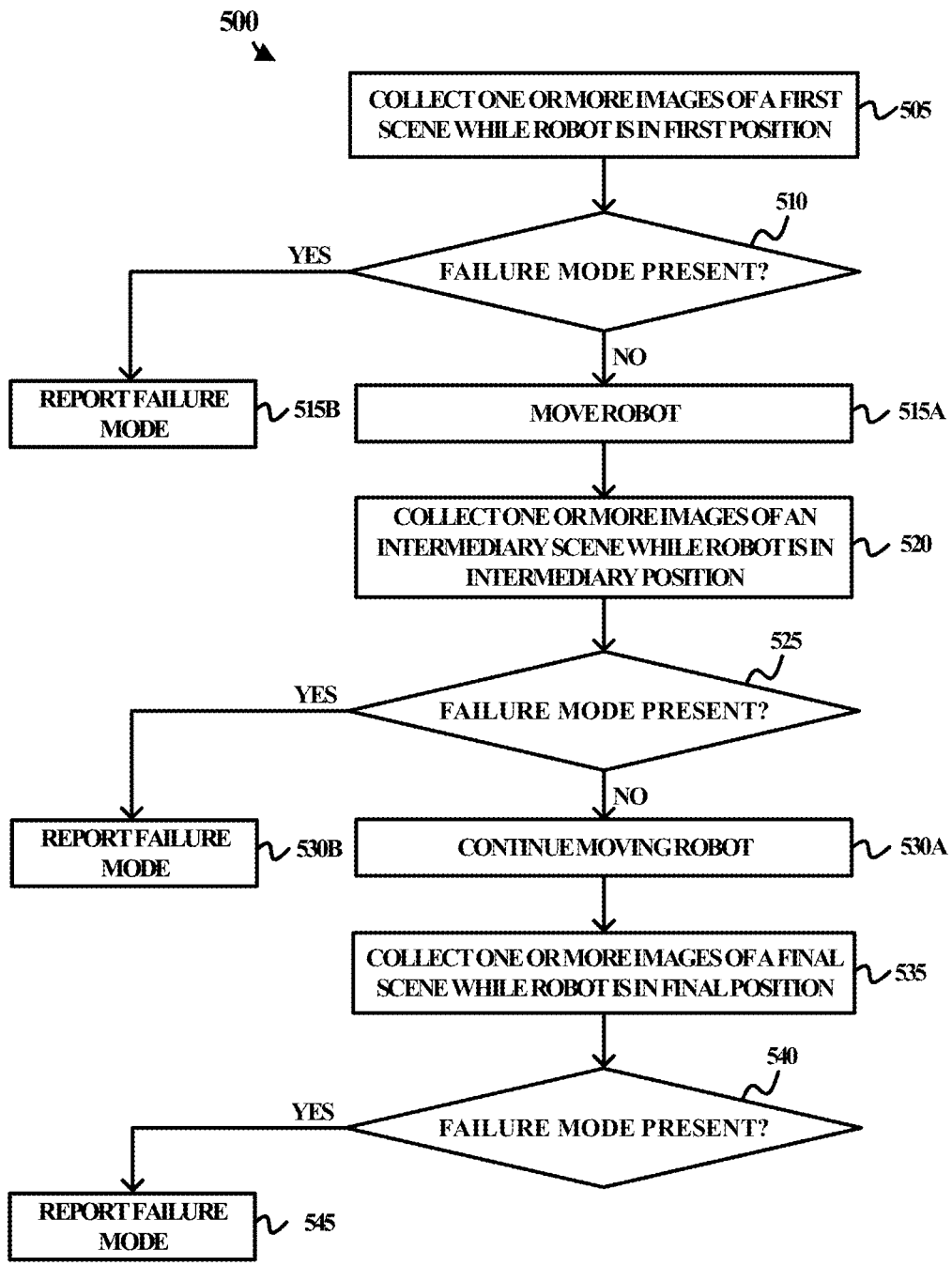
FIG. 5 is a flow chart illustrating a series of steps in accordance with some embodiments of the present technology.

FIG. 5 illustrates process 500 for detecting failure modes and operating a robotic device in accordance with the present technology. In step 505, at least one camera is used to collect one or more images of a first scene while a robot is in a first position. The first scene may include or may not include the robot. The one or more images are then processed using deep learning techniques, in some embodiments, and used to determine if a failure mode is present in step 510. If a failure mode is present, the system reports that the failure mode is present in step 515B. A report may be generated and communicated to a person or system responsible for addressing errors, in some examples. Furthermore, the system may direct the robot to cease motion upon detecting that a failure mode is present so that the error can be addressed. Alternatively, instead of or in addition to reporting that a failure mode was detected, process 500 may further include resolving an error associated with the error mode.

If a failure mode is not present, the robot may begin a robotic motion cycle in step 515A. Then, in step 520, at least one camera is used to collect one or more images of an intermediary scene while the robot is in an intermediary position. The intermediary position may be while the robot is stationary, in some examples, while in other examples the robot may be in motion in the intermediary position. The images are then processed and used to determine if a failure mode is present in step 525. If it is determined that a failure mode is present, the system may report that the failure mode is present in step 530B. A report may be generated and communicated to a person or system responsible for addressing errors, in some examples. Furthermore, the system may direct the robot to cease motion upon detecting that a failure mode is present so that the error can be addressed. In other examples, the robot may continue moving after step 530B. Alternatively, instead of or in addition to reporting that a failure mode was detected, process 500 may further include resolving an error associated with the error mode.

If it is determined that a failure mode is not present in step 525, the robot is allowed to continue moving until the end of the robotic motion cycle in step 530A. Then, once the robotic motion cycle has reached its end, one or more cameras are used to collect one or more images of a final scene while the robot is in a final position in step 535. The final scene may include or may not include a portion of the robot. The images are then processed and used to determine if a failure mode is present in step 540. If it is determined that a failure mode is present, the system may report that a failure mode is present in step 545. A report may be generated and communicated to a person or system responsible for addressing errors, in some examples. Furthermore, the system may direct the robot to cease motion upon detecting that a failure mode is present so that the error can be addressed, or the robot may return to the beginning of the robotic motion cycle. If a failure mode is not present, the robot may continue operation as usual or return to the beginning of the cycle. Alternatively, instead of or in addition to reporting that a failure mode was detected, process 500 may further include resolving an error associated with the error mode.

The number of steps and timing of steps presented in FIG. 5 is not intended to limit the number of observations that may be used to detect failure modes in accordance with the present technology. In other examples, one, two, four, five, and so on observation points may be utilized for detecting failure modes in accordance with the present technology.

Figure 6B:
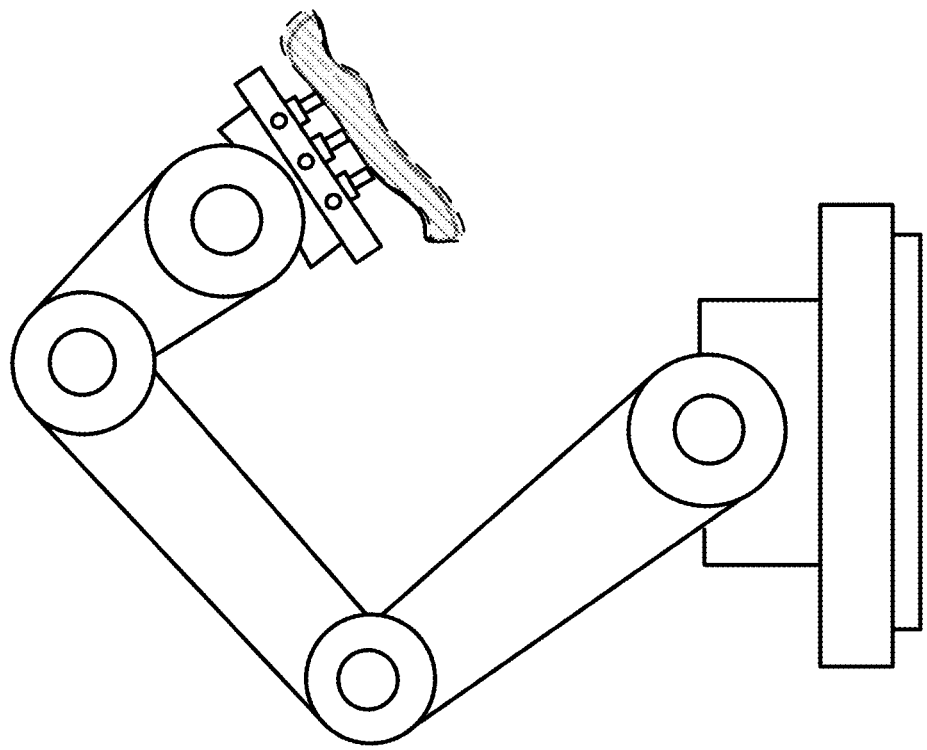
FIGS. 6A-6B illustrate examples of image segmentation in accordance with some embodiments of the present technology.
Figure 6A:
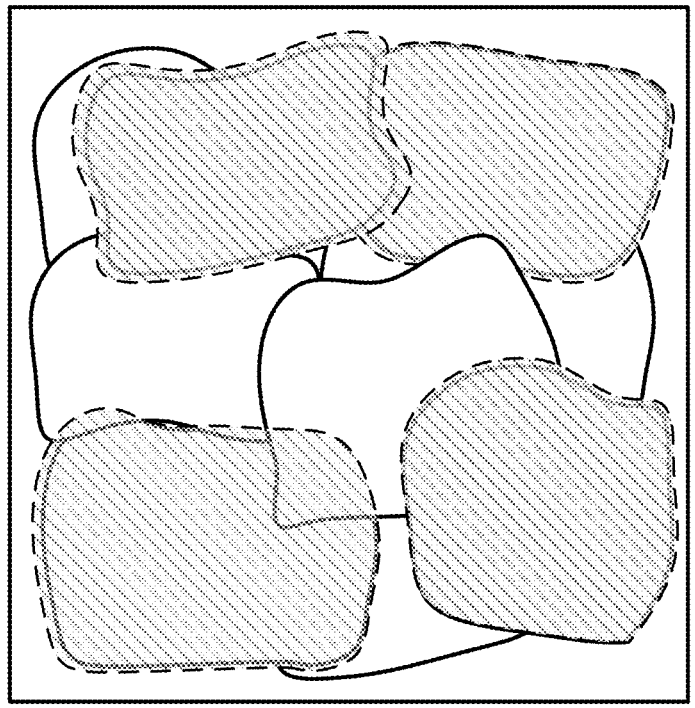

FIGS. 6A and 6B show examples of object segmentation during image processing in accordance with some embodiments of the present technology. Image processing may include a segmentation model in accordance with some of the examples described above. Machine learning techniques may be utilized for generating segmentation predictions in some embodiments of the present technology. Image segmentation may be used to identify distinct objects in a scene, which may include a robotic device in addition to objects such as objects to be picked from a bin, in some examples. As shown in FIG. 6A, a raw image may be taken of items in a bin and a segmentation prediction may be generated based on the raw image. FIG. 6B shows, after a robotic arm attempts to pick up an object from the bin based on the segmentation prediction, other views may be used to generate a segmentation prediction for object that the robotic arm is in possession of after attempting to pick up an item. More than one camera may be used to generate segmentation predictions, and in many scenarios, multiple cameras are used from different angles to improve segmentation results. In some instances, different segmentation predictions may be generated based on each camera view, illustrating further importance for additional means of error detection. Segmentation results, such as those shown in FIGS. 6A and 6B may further be used to detect failure modes in accordance with some embodiments of the present technology.

The example shown in FIG. 6A represents a case in which it may be difficult to accurately process and segment images. For example, products of matching colors and repetitive patterns are stored in clear bags in a bin, thus presenting a challenging scenario for a computer vision system. If a robotic arm attempts to pick up and place items precisely may encounter failure modes such as accidentally picking up multiple items or picking up an item in a bad spot causing it to slide to the corner of the bag and change shape. The issues shown in FIG. 6A may be difficult to detect if just a single picture is taken before attempting to pick up and move an object. However, taking a series of pictures through a robotic motion cycle as discussed herein can help detect failure modes prior to them causing errors.

While several examples are presented herein related to robotic picking environments, the technology described herein is not intended to be limited to robotic picking applications. The present technology has many applications in which an imaging process for detecting failure modes is useful.

The processes described herein may be implemented in several different variations of media including software, hardware, firmware, and variations or combinations thereof. For example, methods of image processing and detecting failure modes described herein may be implemented in software, while a computing vision system or robotic device may be implemented entirely in hardware or a combination. Similarly, embodiments of the technology may be implemented with a trained neural net entirely in software on an external computing system or may be implemented as a combination of the two across one or more devices. The computer vision systems and failure mode detection systems herein may be implemented on various types of components including entirely software-based implementations, entirely hardware-based aspects, such as trained computer vision systems, or variations and combinations thereof.

Figure 7:
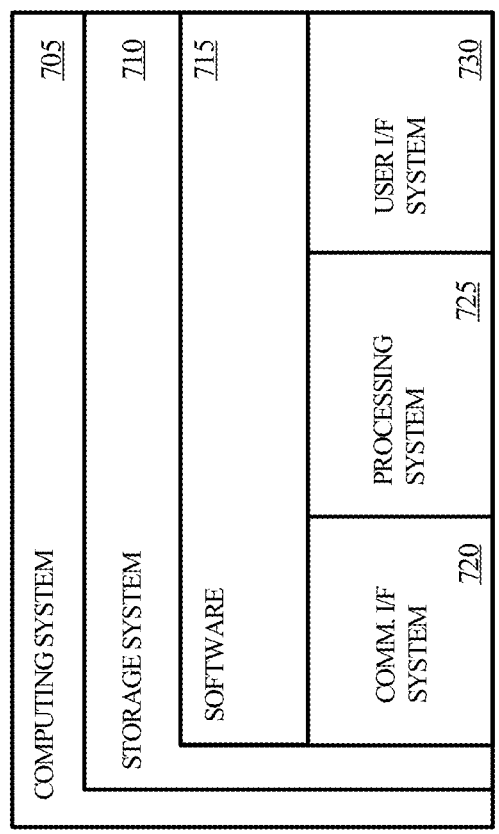
FIG. 7 is an example of a computing system in which some embodiments of the present technology may be utilized.

FIG. 7 illustrates computing system 705 that is representative of any system or collection of systems in which the various processes, programs, services, and scenarios disclosed herein may be implemented. Examples of computing system 705 include, but are not limited to, desktop computers, laptop computers, server computers, routers, web servers, cloud computing platforms, and data center equipment, as well as any other type of physical or virtual server machine, physical or virtual router, container, and any variation or combination thereof.

Computing system 705 may be implemented as a single apparatus, system, or device or may be implemented in a distributed manner as multiple apparatuses, systems, or devices. Computing system 705 may include, but is not limited to, storage system 710, software 715, communication interface system 720, processing system 725, and user interface system 730. Components of computing system 705 may be optional or excluded in certain implementations. Processing system 725 is operatively coupled with storage system 710, communication interface system 720, and user interface system 730, in the present example.

Processing system 725 loads and executes software 715 from storage system 710. Software 715 includes and implements failure mode detection processes described herein, which is representative of the methods discussed with respect to the preceding Figures. When executed by processing system 725, software 715 directs processing system 725 to operate for purposes of failure detection as described herein for at least the various processes, operational scenarios, and sequences discussed in the foregoing implementations. Computing system 705 may optionally include additional devices, features, or functionality not discussed for purposes of brevity.

Referring still to FIG. 7, processing system 725 may comprise a micro-processor and other circuitry that retrieves and executes software 715 from storage system 710. Processing system 725 may be implemented within a single processing device but may also be distributed across multiple processing devices or sub-systems that cooperate in executing program instructions. Examples of processing system 725 include general purpose central processing units, graphical processing units, application specific processors, and logic devices, as well as any other type of processing device, combinations, or variations thereof.

Storage system 710 may comprise any computer readable storage media readable by processing system 725 and capable of storing software 715. Storage system 710 may include volatile and nonvolatile, removable and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 710 may also include computer readable communication media over which at least some of software 715 may be communicated internally or externally. Storage system 710 may be implemented as a single storage device but may also be implemented across multiple storage devices or sub-systems co-located or distributed relative to each other. Storage system 710 may comprise additional elements, such as a controller, capable of communicating with processing system 725 or possibly other systems.

Software 715 may be implemented in program instructions and among other functions may, when executed by processing system 725, direct processing system 725 to operate as described with respect to the various operational scenarios, sequences, and processes illustrated herein. For example, software 715 may include program instructions for implementing failure mode detection processes, computer vision processes, neural networks, decision making processes, or any other reasoning or operational processes as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 715 may include additional processes, programs, or components, such as operating system software, modeling, robotic control software, computer vision software, virtualization software, or other application software. Software 715 may also comprise firmware or some other form of machine-readable processing instructions executable by processing system 725.

In general, software 715 may, when loaded into processing system 725 and executed, transform a suitable apparatus, system, or device (of which computing system 705 is representative) overall from a general-purpose computing system into a special-purpose computing system customized for one or more of the various operations or processes described herein. Indeed, encoding software 715 on storage system 710 may transform the physical structure of storage system 710. The specific transformation of the physical structure may depend on various factors in different implementations of this description. Examples of such factors may include, but are not limited to, the technology used to implement the storage media of storage system 710 and whether the computer-storage media are characterized as primary or secondary storage, as well as other factors.

For example, if the computer readable storage media are implemented as semiconductor-based memory, software 715 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 720 may include communication connections and devices that allow for communication with other computing systems (not shown) over communication networks or connections (not shown). Examples of connections and devices that together allow for inter-system communication may include network interface cards, antennas, power amplifiers, radio-frequency circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 705 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further, any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A method of detecting failure modes in a robotic motion environment, the method comprising:
    collecting one or more first images of a first scene while a robot is in a first position;
    providing the one or more first images of the first scene as input to a convolutional neural network; and
    determining, based at least on a first output of the convolutional neural network, whether a failure mode of a first set of failure modes is present in the first scene, wherein the first output is generated by the convolutional neural network based on the one or more first images;
    when the failure mode of the first set of failure modes is not present in the first scene:
        collecting one or more intermediary images of an intermediary scene while the robot is in an intermediary position;
        providing the one or more intermediary images of the intermediary scene as input into the convolutional neural network; and
        determining, based at least on a second output of the convolutional neural network, whether a failure mode of a second set of failure modes is present in the intermediary scene, wherein the second output is generated by the convolutional neural network based on the one or more intermediary images;
        when the failure mode of the second set of failure modes is not present in the intermediary scene:
            collecting one or more final images of a final scene while the robot is in a final position;
            providing the one or more final images of the final scene as input into the convolutional neural network; and
            determining, based at least on a third output of the convolutional neural network, whether a failure mode of a third set of failure modes is present in the final scene, wherein the third output is generated by the convolutional neural network based on the one or more final images; and when one or more failure modes of one or more of the first set of failure modes, the second set of failure modes, and the third set of failure modes is detected, pausing motion of the robot.

2. The method of claim 1, further comprising producing, at least in part by the convolutional neural network, a segmentation prediction based on the one or more first images, wherein the segmentation prediction identifies one or more distinct objects in the first scene, and wherein determining whether the failure mode of the first set of failure modes is present in the first scene is based at least on the segmentation prediction.

3. The method of claim 1, wherein the intermediary scene comprises at least a portion of the robot.

4. The method of claim 1, wherein the first set of failure modes comprises a failure mode in which the robot is in a position that will cause an error.

5. The method of claim 1, wherein the robot is a robotic arm configured to pick and place objects.

6. The method of claim 5, wherein:
the first scene comprises one or more objects for the robot to pick up;
the one or more first images of the first scene are collected before the robot attempts to pick up an object of the one or more objects from the first scene;
the one or more intermediary images of the intermediary scene are collected after the robot attempts to pick up the object of the one or more objects from the first scene;
the intermediary scene comprises at least a portion of the robot and at least one object of the one or more objects from the first scene picked up by the robot;
the one or more final images of the final scene are collected after the robot attempts to place the one or more objects from the first scene picked up by the robot; and
the final scene comprises an area in which the robot attempts to place the one or more objects from the first scene picked up by the robot.

7. The method of claim 1, wherein the second set of failure modes comprises a failure mode in which the robot picked up two objects.

8. The method of claim 1, wherein the second set of failure modes comprises a failure mode in which the robot is in a position that will cause an error.

9. The method of claim 1, further comprising:
when the failure mode of the first set of failure modes is present in the first scene, resolving an error associated with the failure mode of the first set of failure modes;
when the failure mode of the second set of failure modes is present in the intermediary scene, resolving an error associated with the failure mode of the second set of failure modes; and
when the failure mode of the third set of failure modes is presented in the final scene, resolving an error associated with the failure mode of the third set of failure modes.

10. A failure mode detection system comprising:
one or more computer-readable storage media;
a processing system operatively coupled to the one or more computer-readable storage media; and
program instructions, stored on the one or more computer-readable storage media, wherein the program instructions, when read and executed by the processing system, direct the processing system to:
collect one or more first images of a first scene while a robot is in a first position;
provide the one or more first images of the first scene as input to a convolutional neural network; and
determine, based at least on a first output of the convolutional neural network, whether a failure mode of a first set of failure modes is present in the first scene, wherein the first output is generated by the convolutional neural network based on the one or more first images;
when the failure mode of the first set of failure modes is not present in the first scene:
collect one or more intermediary images of an intermediary scene while the robot is in an intermediary position;
provide the one or more intermediary images of the intermediary scene as input into the convolutional neural network; and
determine, based at least on a second output of the convolutional neural network, whether a failure mode of a second set of failure modes is present in the intermediary scene, wherein the second output is generated by the convolutional neural network based on the one or more intermediary images;
when the failure mode of the second set of failure modes is not present in the intermediary scene:
collect one or more final images of a final scene while the robot is in a final position;
provide the one or more final images of the final scene as input into the convolutional neural network; and
determine, based at least on a third output of the convolutional neural network, whether a failure mode of a third set of failure modes is present in the final scene, wherein the third output is generated by the convolutional neural network based on the one or more final images; and
when one or more failure modes of one or more of the first set of failure modes, the second set of failure modes, and the third set of failure modes is detected, halt motion of the robot.

11. The failure mode detection system of claim 10, wherein the program instructions, when read and executed by the processing system, further direct the processing system to produce, at least in part by the convolutional neural network, a segmentation prediction based on the one or more first images, wherein the segmentation prediction identifies one or more distinct objects in the first scene, and wherein determining whether the failure mode of the first set of failure modes is present in the first scene is based at least on the segmentation prediction.

12. The failure mode detection system of claim 10, wherein the first set of failure modes comprises a failure mode in which the robot is in a position that will cause an error.

13. The failure mode detection system of claim 10, wherein the robot is a robotic arm configured to pick and place objects.

14. The failure mode detection system of claim 13, wherein:
the first scene comprises one or more objects for the robot to pick up;
the one or more first images of the first scene are collected before the robot attempts to pick up an object of the one or more objects from the first scene;
the one or more intermediary images of the intermediary scene are collected after the robot attempts to pick up the object of the one or more objects from the first scene;

the intermediary scene comprises at least a portion of the robot and at least one object of the one or more objects from the first scene picked up by the robot;

the one or more final images of the final scene are collected after the robot attempts to place the one or more objects from the first scene picked up by the robot; and the final scene comprises an area in which the robot attempts to place the one or more objects from the first scene picked up by the robot.

15. The failure mode detection system of claim 10, wherein the second set of failure modes comprises a failure mode in which the robot picked up two objects.

16. The failure mode detection system of claim 10, wherein the second set of failure modes comprises a failure mode in which the robot is in a position that will cause an error.

17. The failure mode detection system of claim 10, wherein the program instructions, when read and executed by the processing system, further direct the processing system to:

when the failure mode of the first set of failure modes is present in the first scene, resolve an error associated with the failure mode of the first set of failure modes;

when the failure mode of the second set of failure modes is present in the intermediary scene, resolve an error associated with the failure mode of the second set of failure modes; and when the failure mode of the third set of failure modes is presented in the final scene, resolve an error associated with the failure mode of the third set of failure modes.

18. A failure mode detection system, the failure mode detection system comprising:

at least one robot configured to perform a task;

a computer-vision system configured to capture one or more images at multiple stages of the task;

program instructions, stored on one or more computer-readable storage media, wherein the program instructions, when read and executed by a processing system, direct the processing system to:

collect one or more first images of a first scene while a robot is in a first position;

provide the one or more first images of the first scene as input to a convolutional neural network; and determine, based at least on a first output of the convolutional neural network, whether a failure mode of a first set of failure modes is present in the first scene, wherein the first output is generated by the convolutional neural network based on the one or more first images;

when the failure mode of the first set of failure modes is not present in the first scene:

collect one or more intermediary images of an intermediary scene while the robot is in an intermediary position;

provide the one or more intermediary images of the intermediary scene as input into the convolutional neural network; and determine, based at least on a second output of the convolutional neural network, whether a failure mode of a second set of failure modes is present in the intermediary scene, wherein the second output is generated by the convolutional neural network based on the one or more intermediary images;

when the failure mode of the second set of failure modes is not present in the intermediary scene:

collect one or more final images of a final scene while the robot is in a final position;

provide the one or more final images of the final scene as input into the convolutional neural network; and determine, based at least on a third output of the convolutional neural network, whether a failure mode of a third set of failure modes is present in the final scene, wherein the third output is generated by the convolutional neural network based on the one or more final images; and when one or more failure modes of one or more of the first set of failure modes, the second set of failure modes, and the third set of failure modes is detected, halt motion of the robot.

19. The failure mode detection system of claim 18, wherein the program instructions, when read and executed by the processing system, further direct the processing system to produce, at least in part by the convolutional neural network, a segmentation prediction based on the one or more first images, wherein the segmentation prediction identifies one or more distinct objects in the first scene, and wherein determining whether the failure mode of the first set of failure modes is present in the first scene is based at least on the segmentation prediction.

20. The failure mode detection system of claim 18, wherein the first set of failure modes comprises a failure mode in which no objects are present.

* * * * *